Oct. 13, 1931.  F. J. KUBLER  1,827,394
VEHICLE BODY
Filed July 24, 1928
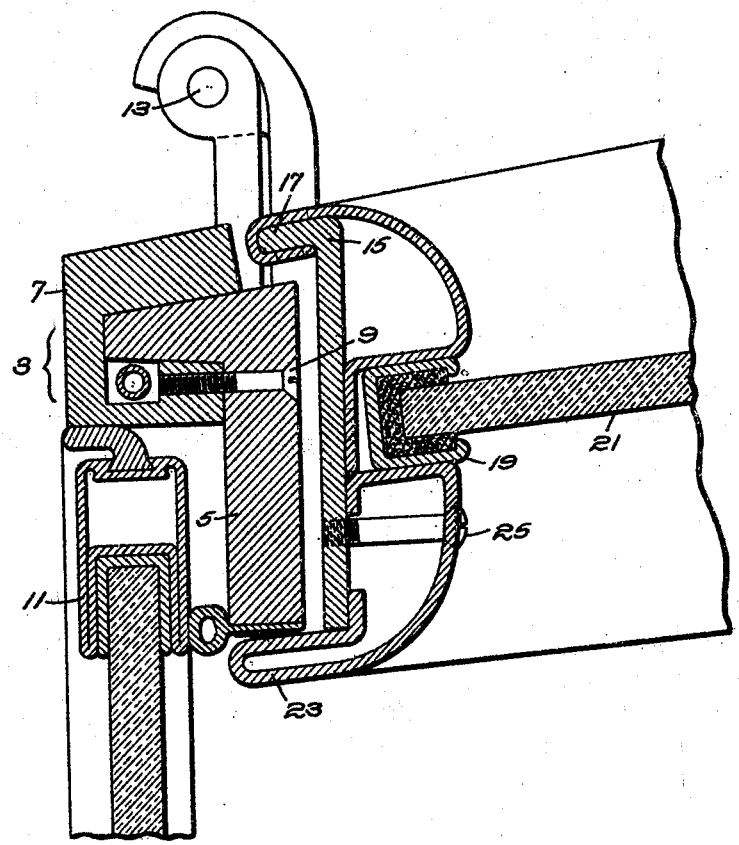
Inventor:
Frederick J. Kubler,
by Emery, Booth, Janney & Varney
Attys.

Patented Oct. 13, 1931

1,827,394

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

VEHICLE BODY

Application filed July 24, 1928. Serial No. 294,989.

This invention relates to automobile bodies and the object is to provide improved means for finishing the interior of the door along the hinge side thereof above the belt and also as a coordinate object to provide means for staunching the door joint at that location. While not limited thereto, the invention finds a particular application in the case of the front doors of closed vehicles hung by their forward edges to body hinge posts arising adjacent the cowl of the vehicle and providing also for the support of the windshield, and by way of example I have here illustrated such a construction.

My invention will be well understood from the following description taken in connection with the accompanying drawing which is a horizontal section through the forward body pillar of a closed vehicle and adjacent portions of the door and windshield.

Referring to the drawing, I have there shown a body hinge pillar 3 arising adjacent the cowl of the vehicle and which may include a main section 5, which may be a drop forging, incorporated with the framework of the vehicle below the belt, and a finish section 7, which may be a die casting, detachably secured thereto by means of the screws 9. This particular construction of body pillar is no part of the invention claimed in the present application. The transverse flange of the section 5 provides a seat for the windshield 11, herein shown as of the swinging type. The rear face of the forward section 5, the right-hand face in the drawing, constitutes the jamb face of the pillar.

Hung on the pillar 3 by means of suitable hinges 13 is the door having a door hinge pillar 15, here shown as of sheet metal provided with the flange 17 providing an overlap. At the rear face of the pillar is the glass channel 19 receiving the usual sliding glass 21. At the inner side of the glass 21 the window opening is finished by means of a suitable garnish molding 23, herein shown as formed of sheet metal and as secured by screws 25, which molding covers the rear face of the pillar 15 inwardly of the location of the channel 19. This garnish molding is provided with a flange 25 which extends over the inner edge of door pillar 15 and past the door joint between the jamb face of that pillar and the jamb face of the body hinge pillar 3 and forms an overlap flange, and it preferably also extends over the inner face of the transverse flange of the main member 5 of the body pillar 3 to the location of the windshield seat.

When the garnish molding is arranged to provide an interior overlap flange as herein described, the usual windlace may, if desired, be dispensed with at this location and an exceptionally neat finish for the interior of the door is provided. The garnish molding may also serve to cover and provide a finish for the vertical edges of the body pillar or post 3 at the windshield opening.

Having described in detail the particular embodiment of my invention shown by way of example in the accompanying drawing, what I claim as new and desire to secure by Letters Patent I shall express in the following claims.

I claim:

1. In an automobile body a body hinge pillar, a door of the type having a sliding window therein, the hinge pillar of said door being hung on the body hinge pillar and having at one side thereof a glass channel, a garnish molding carried by said pillar at the inner side of said channel and having a flange extending over and beyond the inner side of the pillar to extend over the door joint when the door is closed.

2. In an automobile door a combined interior garnish molding and door joint overlap flange.

3. An automobile body having a body hinge pillar rising adjacent the cowl and having a flange at its inner rear portion defining a seat for a windshield and presenting rearwardly a jamb face for cooperation with a door hinge pillar, a door hung thereon and a finishing strip carried by the inner face of the door hinge pillar projecting when the door is closed over the door joint and the inner edge of said flange.

4. An automobile body having a body hinge pillar rising adjacent the cowl and having a flange at its inner rear portion defining a seat for a windshield and presenting rearwardly a jamb face for cooperation with a door hinge pillar, a door of the type having a sliding glazing, the hinge pillar of said door being hung on said body pillar and having a glass channel on its rear face and a garnish molding carried by said pillar on the inner side of said channel and having a flange extending over and beyond the inner side of the pillar to extend when the door is closed over the door joint and the inner edge of said flange.

In testimony whereof, I have signed my name to this specification.

FREDERICK J. KUBLER.